US011508139B2

(12) United States Patent
Otaka

(10) Patent No.: US 11,508,139 B2
(45) Date of Patent: Nov. 22, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Futoshi Otaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/020,768

(22) Filed: Sep. 14, 2020

(65) Prior Publication Data
US 2021/0216803 A1    Jul. 15, 2021

(30) Foreign Application Priority Data

Jan. 10, 2020  (JP) .............................. JP2020-003225

(51) Int. Cl.
| | |
|---|---|
| *G06V 10/22* | (2022.01) |
| *G06V 10/44* | (2022.01) |
| *G06V 30/148* | (2022.01) |
| *G06V 30/10* | (2022.01) |
| *G06V 30/14* | (2022.01) |
| *G06V 10/24* | (2022.01) |
| *G06K 9/62* | (2022.01) |

(52) U.S. Cl.
CPC ........... *G06V 10/22* (2022.01); *G06K 9/6264* (2013.01); *G06V 10/443* (2022.01); *G06V 30/153* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 8,139,870 B2 | 3/2012 | Kato | |
| 11,074,392 B2* | 7/2021 | Takahashi | ............. G06F 40/106 |
| 2017/0076150 A1* | 3/2017 | Nakamura | ........... G06V 30/333 |
| 2018/0376008 A1* | 12/2018 | Yoshimura | .............. H04L 51/48 |
| 2020/0394398 A1* | 12/2020 | Pamarthi | ................ G06N 20/00 |
| 2020/0410271 A1* | 12/2020 | Nakazawa | ......... H04N 1/40093 |

FOREIGN PATENT DOCUMENTS

| | | | | | |
|---|---|---|---|---|---|
| CN | 101340395 | A | * | 1/2009 | |
| CN | 110196646 | A | * | 9/2019 | ............. G06F 16/31 |
| EP | 3772015 | A1 | * | 2/2021 | ......... G06K 9/00416 |
| JP | 58169679 | A | * | 10/1983 | ............... G06K 9/03 |
| JP | 59075375 | A | * | 4/1984 | ............... G06K 9/46 |
| JP | 2007233913 | | | 9/2007 | |
| JP | 5459046 | | | 4/2014 | |
| WO | WO-2013038872 | A1 | * | 3/2013 | ......... G06F 3/04886 |

* cited by examiner

*Primary Examiner* — Mohammed Rachedine
(74) *Attorney, Agent, or Firm* — JCIPRNET

(57) ABSTRACT

An information processing apparatus includes a processor configured to extract a mark specified in advance from an image of a document; and acquire a character string by performing character recognition on a region located in a particular direction with respect to a position of the mark, the direction being associated in advance with the mark.

20 Claims, 6 Drawing Sheets

| ATTRIBUTE | CHARACTER STRING |
|---|---|
| PLAN | CREATE DOCUMENT |
| COMPLETED | PURCHASE SNACK |
| AMOUNT OF MONEY | PRODUCT A 1,280 YEN |
| AMOUNT OF MONEY | PRODUCT B 228 YEN |
| AMOUNT OF MONEY | PRODUCT C 948 YEN |
| COMPLETED | RESERVE VIDEO |
| PLAN | PURCHASE BOOK |
| PLAN | CORRECT REPORT |

FIG. 9A

```
<PLAN>
1. CREATE DOCUMENT
2. PURCHASE BOOK
3. CORRECT REPORT
```

FIG. 9B

```
<COMPLETED>
1. PURCHASE SNACK
2. RESERVE VIDEO
```

FIG. 10

|   | A | B |
|---|---|---|
| 1 | PRODUCT A | 1,280 YEN |
| 2 | PRODUCT B | 228 YEN |
| 3 | PRODUCT C | 948 YEN |
| 4 | SUM | 2,456 YEN |

| PLAN | "THE NINTH MISTAKE ELIMINATION SEMINAR" WILL BE HELD IN KAWAGUCHI CITY, SAITAMA, IN APRIL 2020 |
|---|---|
| PLAN | THE PREPARATORY COMMITTEE WILL BE ESTABLISHED IN JANUARY 2020 |
| COMPLETED | "THE EIGHTH MISTAKE ELIMINATION SEMINAR" HELD IN KAWASAKI CITY, KANAGAWA |
| AMOUNT OF MONEY | ATTENDANCE FEE 10,000 YEN |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-003225 filed Jan. 10, 2020.

BACKGROUND

(i) Technical Field

The present disclosure relates to an information processing apparatus and a non-transitory computer readable medium.

(ii) Related Art

In Japanese Unexamined Patent Application Publication No. 2007-233913, an image processing apparatus that extracts a value of an information item from an input document image is disclosed. The image processing apparatus includes an extraction item storing unit that stores extraction item information including an item name of an information item to be extracted, a character recognition unit that performs character recognition on the document image, an item name extraction unit that extracts a character string corresponding to the item name to be extracted stored in the extraction item storing unit on the basis of a result of the character recognition output from the character recognition unit, an item value extraction unit that extracts a character string of an item value corresponding to the item name from a position near the character string corresponding to the item name, and an extraction information creating unit that creates extraction information in which the character string of the item value extracted by the item value extraction unit is associated with the item name.

In Japanese Patent No. 5459046, an information processing apparatus is disclosed. The information processing apparatus includes acquiring means for acquiring handwriting information indicating a chronological change of the position of a writing instrument when handwriting is performed using the writing instrument, detecting means for detecting a handwriting symbol based on the acquired handwriting information, converting means for generating a handwritten image based on the acquired handwriting information and converting the handwritten image into a character string by performing character recognition processing on a predetermined region in the entire region of the handwritten image near a position at which the handwriting symbol is detected, and handwriting symbol associating means for performing predetermined processing corresponding to the handwriting symbol in accordance with detection of the handwriting symbol and applying the character string to the predetermined processing.

SUMMARY

Documents stored in their original state are less likely to be used effectively. Therefore, performing optical character recognition (OCR) processing on documents and storing contents of the documents as character data, that is, document digitization, has been carried out.

In the case where all the pages of a document do not need to be digitized, for example, a user may handwrite a symbol in the document to instruct an information processing apparatus that performs OCR processing to perform character recognition on a region near the symbol.

In this case, the user needs to write a symbol at a position near a character string on which character recognition is to be performed even if the user is unable to easily write the symbol at the position near the character string, for example, even if there is a small blank space. Thus, the symbol may overlap with other characters or the size of the symbol may be too small. Therefore, character recognition may not be performed successfully.

Thus, for example, a method for specifying a region on which an information processing apparatus is to perform character recognition while viewing an image of a document displayed on a screen of the information processing apparatus may be used.

However, for example, because a user specifies a region on which character recognition is to be performed while moving or magnifying an image of a document on a screen that is smaller than the size of the document, usability is degraded compared to the case where a region on which character recognition is to be performed is handwritten in a document.

Aspects of non-limiting embodiments of the present disclosure relate to providing an information processing apparatus and a non-transitory computer readable medium that are able to provide various instructions as well as to specify a region, compared to a case where a symbol is written in a document and an instruction to perform character recognition on a region near the symbol is provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to extract a mark specified in advance from an image of a document; and acquire a character string by performing character recognition on a region located in a particular direction with respect to a position of the mark, the direction being associated in advance with the mark.

BRIEF DESCRIPTION OF THE DRAWINGS

Exemplary embodiments of the present disclosure will be described in detail based on the following figures, wherein:

FIGS. 9A and 9B are diagrams illustrating output examples of character strings output from application;

FIG. 10 is a diagram illustrating another output example of character strings output from the application;

DETAILED DESCRIPTION

Hereinafter, exemplary embodiments of the present disclosure will be described with reference to drawings. The same component elements and the same processes will be referred to with the same reference signs throughout the drawings, and redundant explanation will not be provided.

A "character string" in an exemplary embodiment represents a character or a sequence of characters. A character represents a character code and may be, for example, a hiragana letter, a katakana letter, a kanji character, an alphabet, a symbol, an emoji, or the like.

Figure 1:
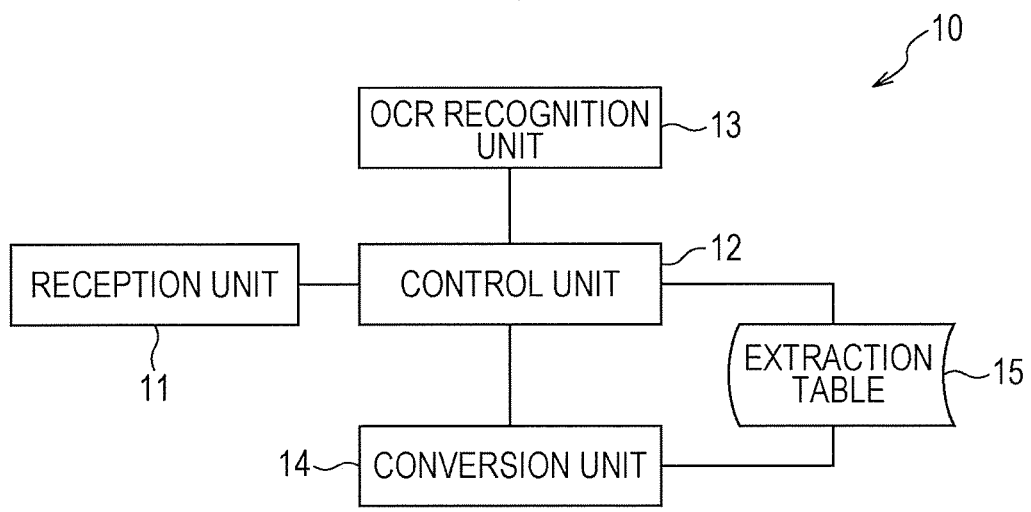
FIG. 1 is a block diagram illustrating an example of the functional configuration of an information processing apparatus.

FIG. 1 is a block diagram illustrating an example of the functional configuration of an information processing apparatus 10 that receives an image of a document 2 generated by optically reading contents of the document 2 using, for example, a scanner device, performs OCR processing on the received image of the document 2, and performs character recognition of character strings written in the document 2. In this example, explanation will be provided on the assumption that the scanner device and the information processing apparatus 10 are different apparatuses. However, the scanner device may be provided in the information processing apparatus 10.

As illustrated in FIG. 1, the information processing apparatus 10 includes functional units including a reception unit 11, a control unit 12, an OCR recognition unit 13, and a conversion unit 14, and an extraction table 15.

The reception unit 11 receives an image of the document 2 on which character recognition is to be performed, and receives an instruction from an operator of the information processing apparatus 10 (hereinafter, referred to as a "user"). The reception unit 11 may receive an image of the document 2 via a communication line, which is not illustrated in FIG. 1, or may receive an image of the document 2 via a portable semiconductor memory such as a memory card or a universal serial bus (USB) memory. The reception unit 11 delivers the received image of the document 2 to the control unit 12.

Figure 2:
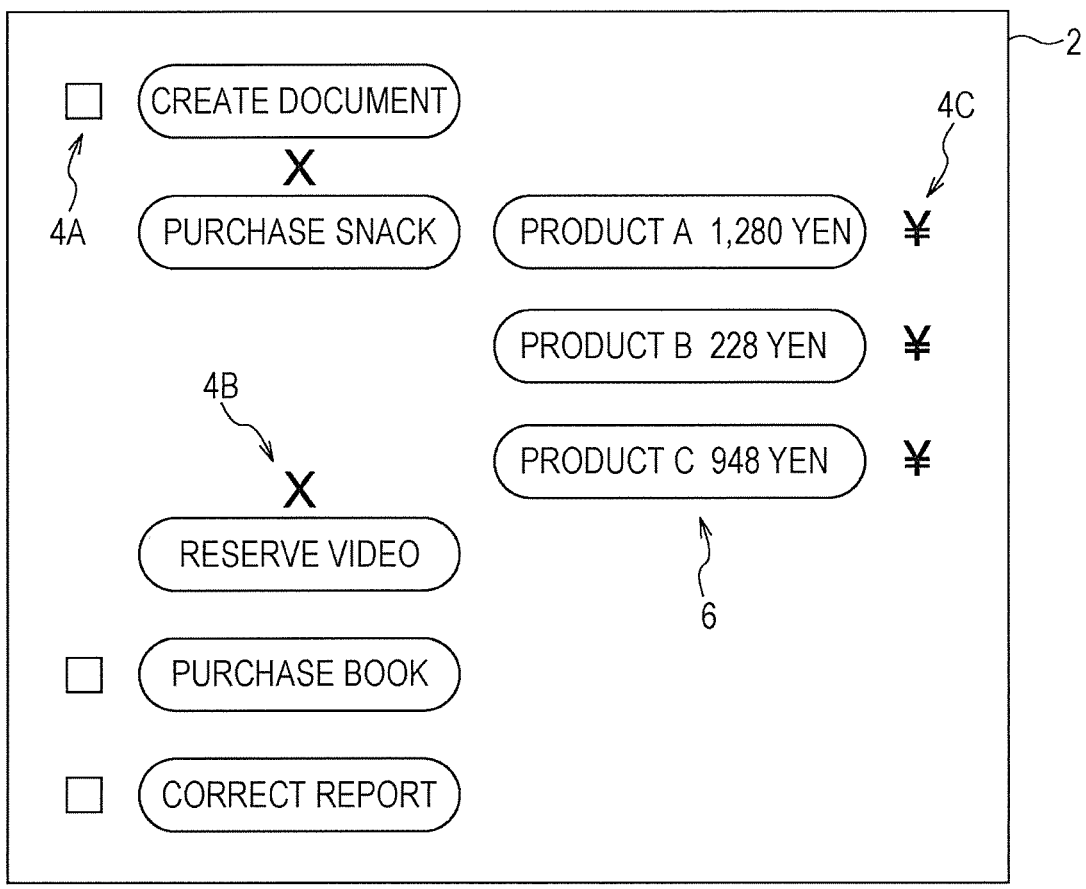
FIG. 2 is a diagram illustrating an example of an image of a document.

FIG. 2 is a diagram illustrating an example of the document 2 received by the reception unit 11. An image of the document 2 that is received by the reception unit 11 contains marks 4 handwritten in the document 2 by a user, such as a mark A, a mark 4B, and a mark 4C, and specified areas 6 represented by boundary lines handwritten by the user such that character strings written in the document 2 are surrounded by the boundary lines.

In the case where there is no need to distinguish among the mark 4A, the mark 4B, and the mark 4C, these marks will be collectively referred to as "marks 4". A mark 4 is an example of a mark in an exemplary embodiment. In the example of the document 2 illustrated in FIG. 2, the mark 4A is a rectangle, the mark 4B is a cross mark, and the mark 4C is a currency symbol of Japanese yen. The type and meaning of the marks 4 handwritten in the document 2 are defined in the extraction table 15. The user handwrites the marks 4, which are defined in the extraction table 15, in the document 2.

Any character strings may be used as the marks 4. The character strings are not necessarily diagrams or symbols. The character strings may be hiragana letters, katakana letters, kanji characters, or alphabets. Furthermore, for example, a mark 4 may be a character string including two or more characters, such as "¥¥" or a combination of characters of different types, such as "mark A".

Figure 3:
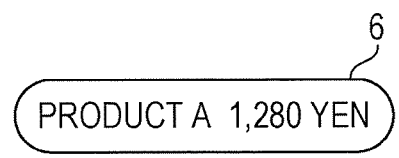
FIG. 3 is a diagram illustrating an example of how a character string is surrounded by a boundary line.

The specified areas 6 represent areas on which character recognition by the OCR recognition unit 13 is to be performed. There is no constraint on the type and shape of boundary lines representing the specified areas 6. The boundary lines may be, for example, solid lines, dotted lines, one-dot-and-dash lines, wavy lines, or double lines. Furthermore, the boundary lines may form any shapes such as circles, ovals, or rectangles. Moreover, the start point and the end point of a boundary line are not necessarily at the same position, that is, a boundary line does not necessarily enclose a character string. There is no constraint on how to surround a character string as long as the information processing apparatus 10 is able to correctly presume a character string surrounded by a boundary line even if the start point and the end point of the boundary line are at different positions, for example, as illustrated in FIG. 3.

The user does not necessarily indicate a specified area 6 clearly by writing a boundary line in the document 2. Hereinafter, however, explanation will be provided on the assumption that the user clearly indicates the specified area 6 in the document 2.

The information processing apparatus 10 identifies regions in the document 2 on which character recognition is to be performed by referring to the marks 4 and the specified areas 6, which are written in the document 2, and the extraction table 15. A method for identifying the regions will be described later in detail.

The control unit 12 controls the OCR recognition unit 13 to perform character recognition on an image of the document 2 delivered by the reception unit 11. Specifically, the control unit 12 refers to the extraction table 15 to provide the OCR recognition unit 13 with an instruction regarding a region on which character recognition is to be performed.

Figure 4:
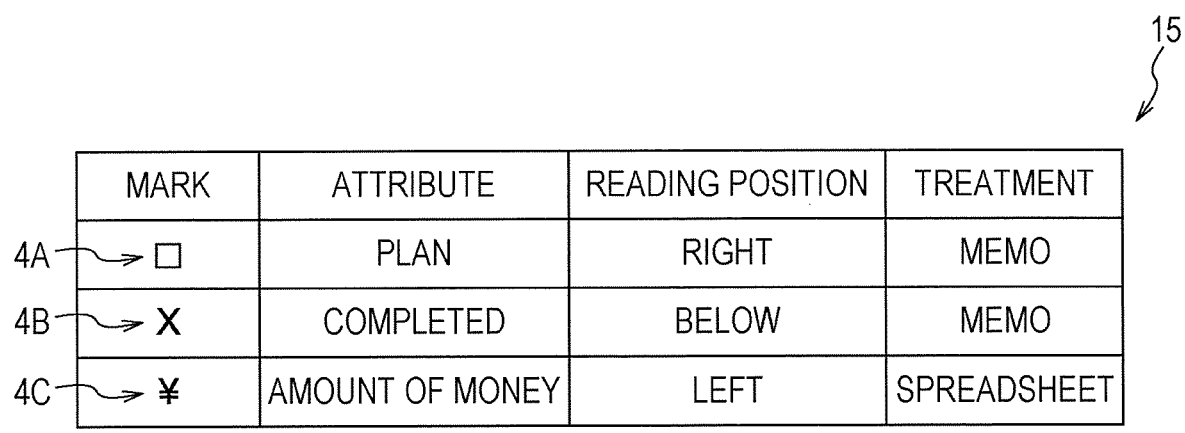
FIG. 4 is a diagram illustrating an example of an extraction table.

FIG. 4 is a diagram illustrating an example of the extraction table 15. As illustrated in FIG. 4, the extraction table 15 contains a mark column, an attribute column, a reading position column, and a treatment column.

In the mark column, the marks 4 written in the document 2 are set. In the example of the extraction table 15 illustrated in FIG. 4, the mark 4A, the mark 4B, and the mark 4C contained in the image of the document 2 illustrated in FIG. 2 are set.

In the attribute column, attributes of character strings corresponding to the marks 4 are set. The attribute of a character string defines the type of contents represented by the character string. In the example of the extraction table 15 illustrated in FIG. 4, attributes "plan", "completed", and "amount of money" are set for the mark 4A, the mark 4B, and the mark 4C, respectively.

In the reading position column, the directions of regions on which character recognition is to be performed with reference to the positions of the marks 4 are set. In the example of the extraction table 15 illustrated in FIG. 4, reading positions "right", "below", and "left" are set for the mark 4A, the mark 4B, and the mark 4C, respectively.

In the treatment column, applications associated in advance with the marks 4 for processing character strings acquired by character recognition as inputs are set. In the example of the extraction table 15 illustrated in FIG. 4, an application "memo" is set for the mark 4A and the mark 4B, and an application "spreadsheet" is set for the mark 4C. "Memo" in the treatment column represents, for example, an application including a function for editing character strings, such as a memo pad. "Spreadsheet" in the treatment column represents an application including a function for adding up or analyzing values by inputting numbers in cells arranged in a grid shape.

There is no need to set the official name of an application in the treatment column of the extraction table 15 as long as the application is able to be uniquely identified, and for example, an abbreviated name of the application, the name of a function provided by the application, the name of an executable file, or the like may be set.

Each piece of information represented by a combination of a mark 4, an attribute, a reading position, and treatment that are associated with one another in a row direction of the extraction table 15 will be referred to as "extraction information".

The control unit 12 provides the OCR recognition unit 13 with an instruction regarding a region in the image of the document 2 on which character recognition is to be performed by providing the OCR recognition unit 13 with a combination of a mark 4 and a reading position defined in the extraction table 15.

The OCR recognition unit 13 extracts the marks 4 provided by the control unit 12 from the image of the document 2, performs, based on each of the extracted marks 4, character recognition on a region located in a direction represented by the reading position associated with the mark 4, and acquires a character string included in the region in the specified direction. The OCR recognition unit 13 provides the control unit 12 with the character string acquired by the character recognition in association with the mark 4 used as a reference for the reading position of the character string for the character recognition.

The control unit 12 receives the character strings from the OCR recognition unit 13, and provides the conversion unit 14 with the character strings acquired by the OCR recognition unit 13.

The conversion unit 14 refers to the extraction table 15 to identify an application associated with a character string on the basis of a corresponding mark 4, and converts the format of the acquired character string into a data format supported by the associated application such that the character string is able to be used in the application associated with the character string.

After conversion into a data format supported by an application associated with character strings at the conversion unit 14, the control unit 12 activates the application associated with the character strings. The control unit 12 causes the character strings in the converted data format to be associated with attributes of the character strings, and then causes the character strings to be read into the associated application. The control unit 12 controls the application to categorize the character strings read into the application according to the attributes and output the categorized character strings.

A scanner device that optically reads contents of the document 2 may be provided in the information processing apparatus 10.

Next, an example of the configuration of a principal part of an electrical system in the information processing apparatus 10 will be described.

Figure 5:
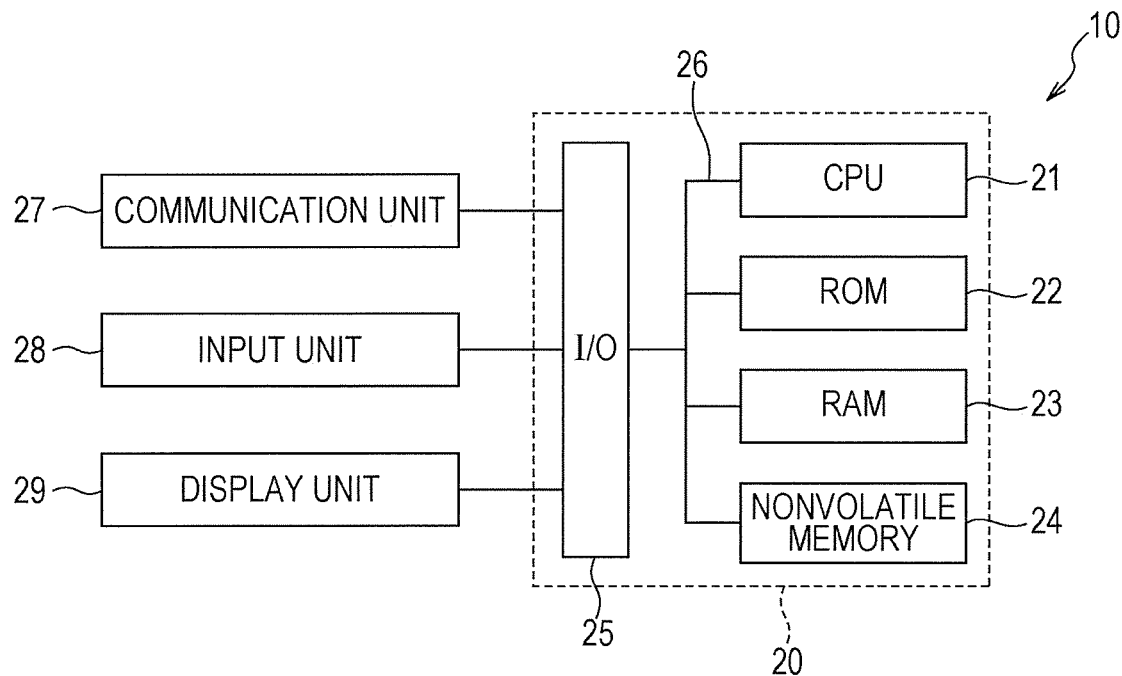
FIG. 5 is a diagram illustrating an example of the configuration of a principal part of an electrical system in an information processing apparatus.

FIG. 5 is a diagram illustrating an example of the configuration of a principal part of an electrical system in the information processing apparatus 10. The information processing apparatus 10 includes, for example, a computer 20.

The computer 20 includes a central processing unit (CPU) 21 that controls functional units of the information processing apparatus 10, a read only memory (ROM) 22 that stores an information processing program for causing the computer 20 to function as the functional units illustrated in FIG. 1, a random access memory (RAM) 23 that is used as a temporary operation region of the CPU 21, a nonvolatile memory 24, and an input/output interface (I/O) 25. The CPU 21, the ROM 22, the RAM 23, the nonvolatile memory 24, and the I/O 25 are connected to one another via a bus 26.

The nonvolatile memory 24 is an example of a memory device in which stored information is maintained even when electric power supplied to the nonvolatile memory 24 is interrupted. The nonvolatile memory 24 is, for example, a semiconductor memory. However, a hard disk may be used as the nonvolatile memory 24. The nonvolatile memory 24 is not necessarily built in the computer 20. The nonvolatile memory 24 may be, for example, a portable memory device that is removable from the computer 20.

For example, a communication unit 27, an input unit 28, and a display unit 29 are connected to the I/O 25.

The communication unit 27 is connected to a communication line, which is not illustrated in FIG. 5. The communication unit 27 includes a communication protocol for performing data communication with an external apparatus connected to the communication line. There is no constraint on the type of the communication protocol used by the communication line. Furthermore, the communication line may be a wired line, a wireless line, or a mixture of wired and wireless lines. Moreover, the communication line may be a dedicated line or a public line shared among an unspecified number of users, such as the Internet.

The input unit 28 is a device that receives an instruction from a user and provides the CPU 21 with the instruction. The input unit 28 includes, for example, a button, a touch panel, a keyboard, and a mouse. In the case where an instruction from a user is provided as speech, a microphone may be used as the input unit 28.

The display unit 29 is a device that displays information processed by the CPU 21. The display unit 29 may be, for example, a liquid crystal display or an organic electroluminescence (EL) display.

Units connected to the I/O 25 are not limited to the units illustrated in FIG. 5. For example, other units such as an image forming unit that forms an image on a recording medium such as paper may be connected to the I/O 25. Furthermore, in the case where an image of the document 2 is acquired via a portable semiconductor memory instead of acquired from a scanner device via a communication line, which is not illustrated in FIG. 5, the information processing apparatus 10 does not necessarily include the communication unit 27.

In contrast, in the case where the information processing apparatus 10 is established using a cloud service, the information processing apparatus 10 needs to include the communication unit 27. However, the information processing apparatus 10 may not need to include the input unit 28 and the display unit 29.

Next, an operation of the information processing apparatus 10 that performs character recognition of a character string included in an image of the document 2 will be described in detail.

Figure 6:
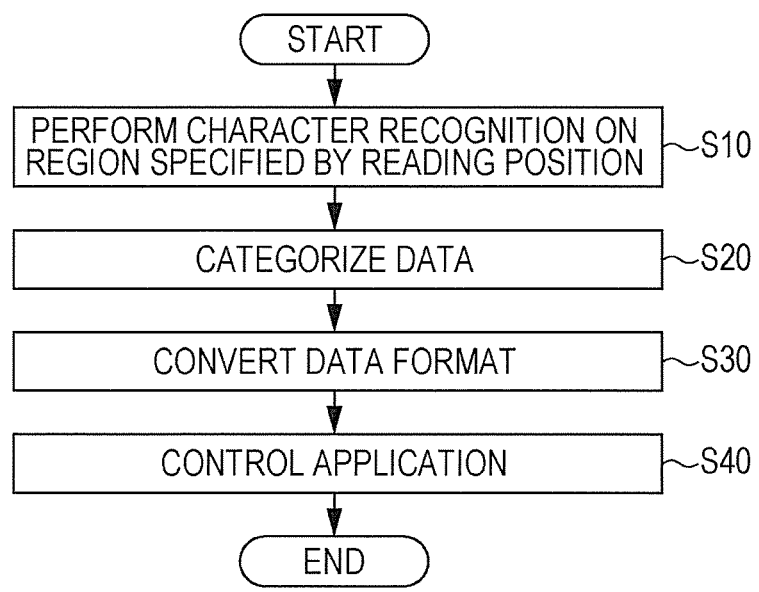
FIG. 6 is a flowchart illustrating an example of a character recognition process.

FIG. 6 is a flowchart illustrating an example of a character recognition process performed by the CPU 21 of the information processing apparatus 10 when the information processing apparatus 10 receives an image of the document 2. An information processing program that defines the character recognition process is stored in advance in, for example, the ROM 22 of the information processing apparatus 10. The CPU 21 of the information processing apparatus 10 reads the information processing program stored in the ROM 22 and performs the character recognition process.

An operation of the information processing apparatus 10 will be described below by taking an example in which the image of the document 2 illustrated in FIG. 2 is received. It is assumed that the extraction table 15 illustrated in FIG. 4 is stored in advance in the nonvolatile memory 24.

In step S10, the CPU 21 detects marks 4 defined in the mark column of the extraction table 15 from the received image of the document 2, using a known pattern recognition method or the like. The CPU 21 refers to the extraction table 15 to acquire reading positions associated with the detected marks 4, and performs character recognition on regions located in directions represented by the reading positions. That is, the CPU 21 does not set the entire image of the document 2 as target areas for character recognition or does not set regions within predetermined areas from the marks 4, that is, regions near the marks 4, as target regions for character recognition. The CPU 21 sets regions located in specified directions based on the marks 4 as target regions for character recognition.

In the case where the mark 4A is detected from the image of the document 2, the CPU 21 performs character recognition on a region located to the right of the mark 4A. In the case where the mark 4B is detected from the image of the document 2, the CPU 21 performs character recognition on a region located below the mark 4B. In the case where the mark 4C is detected from the image of the document 2, the CPU 21 performs character recognition on a region located to the left of the mark 4C.

As illustrated in FIG. 2, in the case where the specified areas 6 for specifying, using boundary lines, areas of character strings as targets for character recognition are set, the CPU 21 performs character recognition of character strings within the specified areas 6 in regions located in directions indicated by reading positions associated with the marks 4. An area on which character recognition is to be performed is clearly defined by the specified area 6 represented by a boundary line. Thus, compared to the case where a region on which character recognition is to be performed is specified only by a reading position, only a character string that a user wishes to acquire is able to be acquired from the image of the document 2.

Figures 7, 8:
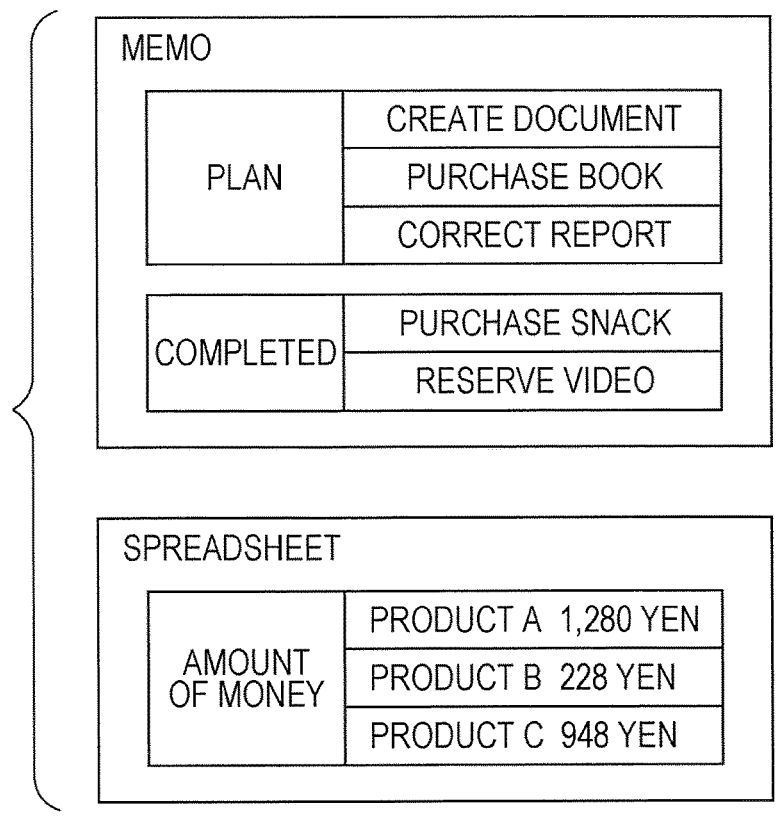
FIG. 7 is a diagram illustrating an example of character strings acquired by character recognition.
FIG. 8 is a diagram illustrating an example of categorization of acquired character strings.

FIG. 7 is a diagram illustrating an example of character strings acquired when character recognition is performed on the image of the document 2 illustrated in FIG. 2. As illustrated in FIG. 7, the CPU 21 stores character strings acquired by character recognition and attributes of the character strings, the attributes being associated with the character strings based on the marks 4, into the RAM 23 such that the character strings and the attributes are associated with each other.

In FIG. 7, a state in which character strings "create document", "purchase book", and "correct report" are acquired as character strings associated with an attribute "plan", character strings "purchase snack" and "reserve video" are acquired as character strings associated with an attribute "completed", and character strings "product A 1,280 yen", "product B 228 yen", and "product C 948 yen" are acquired as character strings associated with an attribute "amount of money" is illustrated.

In the case where an attribute corresponding to a mark 4 is "amount of money", a character string representing a currency such as "yen" or "¥" and a number or a character string that is often used for representing the amount of money (accessory character string) may be included in an acquired character string. Thus, in the case where a plurality of specified areas 6 are detected in a direction indicated by a reading position corresponding to a mark 4, the CPU 21 may recognize a specified area 6 including a character string representing a currency and a number or an accessory character string as a region including a character string corresponding to the attribute "amount of money". An accessory character string for the attribute "amount of money" may be, for example, the name of a product to be sold or purchased, "expense", "sales", or "profit". Such accessory character strings may be categorized according to attributes and stored in advance in the nonvolatile memory 24.

As described above, an attribute of a character string and characteristics of the character string having the attribute are associated with each other in advance. The CPU 21 determines, based on whether or not characteristics of a character string acquired by character recognition are the same as characteristics of a character string having a specified attribute, whether a character string that a user wishes to acquire is correctly acquired from the image of the document 2.

As described above, the CPU 21 acquires a reading position associated with the detected mark 4, and performs character recognition on a region located in a direction indicated by the reading position. In the case where no specified area 6 is present in the direction indicated by the reading position, the CPU 21 may not perform character recognition or may not acquire a character string.

In step S20, the CPU 21 refers to the extraction table 15 to categorize the character strings acquired in step S10 according to attributes, based on the marks 4 used when acquiring the character strings, and categorize the character strings, which have been categorized according to the attributes, according to applications set in the treatment column of the extraction table 15.

FIG. 8 is a diagram illustrating an example in which the acquired character strings in the example of FIG. 7 are categorized according to the attributes and according to the applications.

In the extraction table 15 illustrated in FIG. 4, an application associated with character strings with the attributes "plan" and "completed" is set to "memo". Thus, the character strings with the attributes "plan" and "completed" are categorized into "memo". Furthermore, in the extraction table 15 illustrated in FIG. 4, an application associated with a character string with the attribute "amount of money" is set to "spreadsheet". Thus, the character string with the attribute "amount of money" is categorized into "spreadsheet".

In step S30, the CPU 21 converts the data format of each of the character strings categorized in step S20 into a data format supported by an application into which the character string is categorized.

For example, in the case where the data format of a character string acquired by character recognition is "Shift_JIS" and the data format of a character string supported by an application associated with "memo" in the treatment column (hereinafter, referred to as an "editor") is "Unicode", the CPU 21 converts the data format of the character string from "Shift_JIS" into "Unicode". Furthermore, in the case where an application associated with "spreadsheet" in the treatment column (hereinafter, referred to as a "spreadsheet application") is only able to read character strings described in a comma separated value (CSV) format, the CPU 21 converts the data format of the character string into the CSV format. As described above, conversion of a data format in an exemplary embodiment not only includes conversion of a data format representing a character string itself but also includes conversion of a file format in which a character string is described.

In step S40, the CPU 21 activates an application into which each of the character strings is categorized, and causes the application to read the corresponding character string whose data format has been converted in step S30. In this case, the CPU 21 also causes the application to read the attribute of the corresponding character string.

Then, the CPU 21 controls the application to categorize the read character strings according to the attribute and output the categorized character string.

FIGS. 9A and 9B are diagrams illustrating output examples of character strings output from an editor that has read character strings categorized into "memo" in FIG. 8. FIG. 9A illustrates an output example of character strings associated with the attribute "plan", and FIG. 9B illustrates an output example of character strings associated with the attribute "completed". As described above, the CPU 21 categorizes character strings acquired from the document 2 according to attributes of the character strings and then causes an application to output the categorized character strings. Thus, character strings written in the document 2 are categorized according to attributes and then output from an application, without a user operating the application and performing editing for categorizing the character strings according to the attributes.

FIG. 10 is a diagram illustrating an output example of character strings output from a spreadsheet application that has read character strings categorized into "spreadsheet" in FIG. 8.

In FIG. 10, character strings "A" and "B" written in the top row and character strings "1" to "4" written in the leftmost column are indices for specifying cells. For example, when a cell "B1" is specified, a cell in which "1,280 yen" is written is specified.

In the example of FIG. 10, results obtained by the CPU 21 converting the format of character strings "product A 1,280 yen", "product B 228 yen", and "product C 948 yen" illustrated in FIG. 8 into the CSV format of a combination of a product name and the amount of money, such as "product A, 1,280 yen", "product B, 228 yen", and "product C, 948 yen", respectively, and causing the spreadsheet application to read the CSV format are illustrated. Thus, product names and amounts of money are written in different cells.

The CPU 21 may not only control an application to categorize character strings according to attributes and then output the categorized character strings but also control the application to perform postprocessing using the categorized character strings. In the example of FIG. 10, a result obtained by the CPU 21 controlling the spreadsheet application to output the sum of the amounts of money in the cells "B1" to "B3" into the cell "B4" is illustrated.

For example, font type, font size, font color, and formatting of a character string such as underlining a character string, which are used for representing a character string in an application, are examples of postprocessing in the application and are controlled by the CPU 21.

A state in which a character string is output from an application represents a state in which a user is able to recognize a character string. Specifically, the state in which a character string is output from an application includes a mode in which a character string is output as speech, a mode in which a character string is printed on a recording medium by an image forming unit, which is not illustrated in drawings, a mode in which data including a character string is stored in an external device such as a data server via a communication line, which is not illustrated in drawings, so that a user is able to confirm the character string through the external device, and a mode in which a character string is stored in a portable semiconductor memory specified by a user, as well as a mode in which a display including a character string is displayed on the display unit 29.

The example in which the information processing apparatus 10 acquires a character string specified by a user from the document 2 in which relatively short character strings including, for example, ten characters or less, as illustrated in FIG. 2, has been described above. However, the information processing apparatus 10 may also acquire a character string specified by a user from a document 2A in which text including sentences divided by punctuation marks, as illustrated in FIG. 11, is written.

Figures 11, 12:
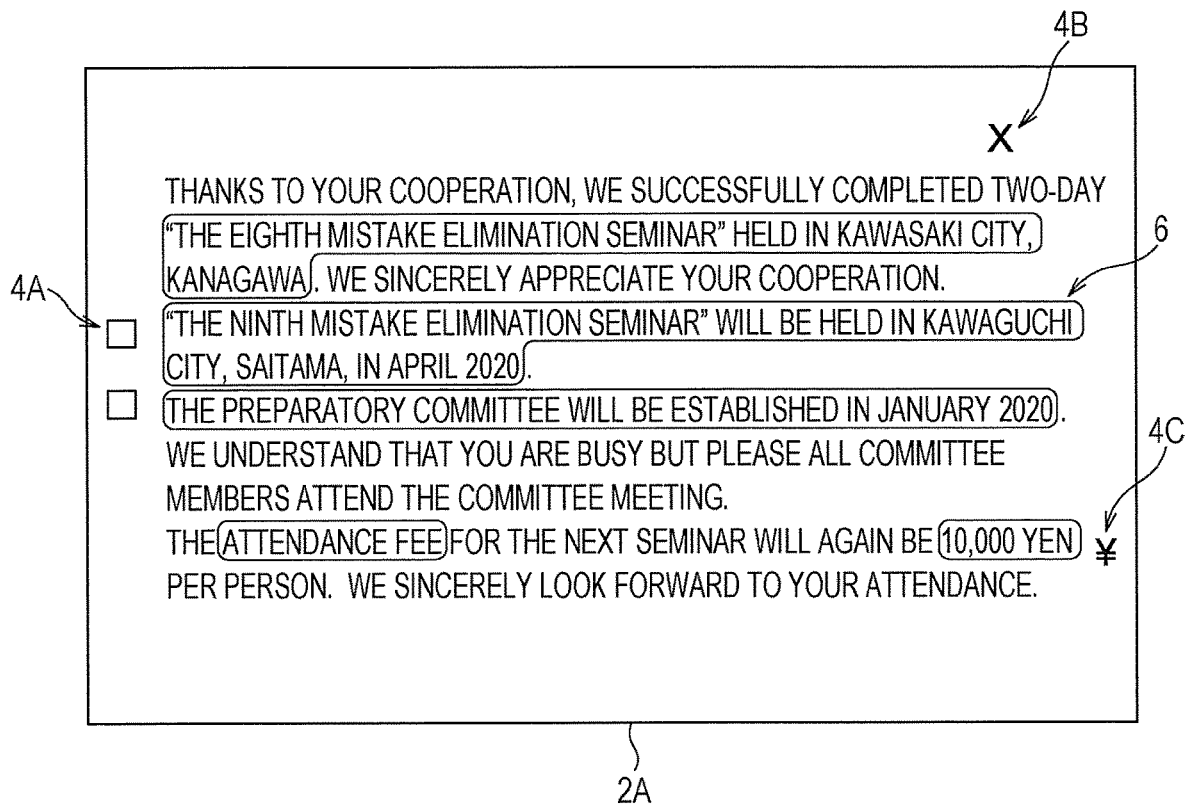
FIG. 11 is a diagram illustrating an example of an image of a document in which text is written.
FIG. 12 is a diagram illustrating an example of character strings acquired from the image of the document in which the text is written.

In the example of the document 2A illustrated in FIG. 11, marks 4 and specified areas 6 are written in accordance with definition of the extraction table 15 illustrated in FIG. 4. Thus, character strings illustrated in FIG. 12 are acquired from an image of the document 2A.

In the document 2A illustrated in FIG. 11, two specified areas 6 "attendance fee" and "10,000 yen" are located to the left of the mark 4C. One of the specified areas 6 includes a character string "yen" and a number, and the other specified area 6 includes a character string "fee", which is an accessory character string for the attribute "amount of money". In such a case, the CPU 21 may acquire the character strings in regions specified by the specified areas 6 as a series of character strings associated with each other. In the example of FIG. 12, character strings with the attribute "amount of money" associated with the mark 4C are acquired as a series of character strings, such as "attendance fee 10,000 yen".

As described above, a user is able to associate an attribute with a plurality of specified areas 6 using a single mark 4, without associating a specified area 6 with a mark 4 on a one-to-one basis.

In the case where the CPU 21 detects a mark 4 defined in the mark column of the extraction table 15 from the image of the document 2 in step S10 of FIG. 6, the CPU 21 may output the degree of certainty. The degree of certainty represents a value indicating the degree of certainty of a character recognition result. A larger value of the degree of certainty represents a higher probability of correct recognition, that is, it is less likely to mistakenly recognize a mark 4 included in the image of the document 2 as a different mark 4. There is no constraint on the method for calculating the degree of certainty as long as the method conforms to such an evaluation scale. In the information processing apparatus 10 according to an exemplary embodiment, rules covering the similarity between an input image of handwritten characters and a result of character recognition are established using a character recognition method employing the mechanism of human visual sense, and the degree of certainty is thus calculated.

Therefore, in the case where a mark 4 that is likely to be mistakenly recognized is included in the marks 4 that a user sets in the extraction table 15, the degree of certainty of the mark 4 detected from the image of the document 2 tends to be low. Thus, for example, the degrees of certainty of various marks 4 may be stored in advance in the nonvolatile memory 24. In the case where the degree of certainty of a detected mark 4 is equal to or less than a predetermined value, the CPU 21 may cause a mark 4 with a degree of certainty higher than the predetermined value, out of the marks 4 stored in the nonvolatile memory 24, to be displayed on the display unit 29 and recommend the displayed mark 4 to a user as a substitute for the mark 4 with the degree of certainty equal to or less than the predetermined value.

The degree of certainty of a mark 4 stored in the nonvolatile memory 24 may not be a fixed value. The CPU 21 may update, based on the degree of certainty obtained every time that a mark 4 is detected from the image of the document 2, the degree of certainty of the corresponding mark 4. For example, every time that the degree of certainty is acquired for each of the marks 4, the moving average of the degree of certainty may be calculated. The calculated moving average may be used as a new degree of certainty of the corresponding mark 4.

The predetermined value regarding the degree of certainty represents the minimum degree of certainty required to cause a situation in which a mark 4 not set in the extraction table 15 is mistakenly detected from an image of the document 2 as a mark 4 set in the extraction table 15.

Furthermore, instead of specifying a specified area 6 using a boundary line, a user may specify the specified area 6 on the basis of, for example, a combination of a mark 4 and a number following the mark 4. For example, in the case where a user wishes to perform character recognition of a character string in an area that is located to the right of a mark 4 and 2 cm to 4 cm away from the mark 4, a specified area 6 may be specified by "□2-4". The CPU 21 identifies a region on which character string is to be performed in accordance with a predetermined method for specifying a specified area 6.

As described above, the information processing apparatus 10 according to an exemplary embodiment performs character recognition on a region located in a direction represented by a mark 4, on the basis of the mark 4 that is handwritten in the document 2 by a user. Thus, only by optically reading contents of the document 2 using a scanner device or the like, a region on which character recognition is to be performed is identified from the document 2.

Furthermore, the information processing apparatus 10 categorizes character strings acquired by character recognition according to attributes associated with marks 4, and causes applications associated with the marks 4 to read the categorized character strings. Thus, a step of acquiring a character string from the image of the document 2 and a step of performing processing using the acquired character string are integrated together. Thus, compared to the case where the steps are performed individually, usability is improved.

Exemplary embodiments of the present disclosure have been described above. However, the present disclosure is not limited to the exemplary embodiments described above. Various changes or improvements may be made to exemplary embodiments without departing from the scope of the present disclosure, and aspects to which the changes or improvements have been made are also encompassed within the technical scope of the present disclosure. For example, order of processing steps may be changed without departing from the scope of the present disclosure.

In an exemplary embodiment, an example in which the character recognition process is implemented by software is described. However, a process equivalent to the process represented by the flowchart illustrated in FIG. 6 may be implemented in, for example, an application specific integrated circuit (ASIC), a field programmable gate array (FPGA), or a programmable logic device (PLD) and may be processed by hardware. In this case, compared to the case where the character recognition process is implemented by software, the processing speed may be increased.

As described above, the CPU 21 of the information processing apparatus 10 may be replaced with a dedicated processor specialized in specific processing, such as the ASIC, the FPGA, the PLD, a graphic processing unit (GPU), or a floating point unit (FPU).

Furthermore, operation of the information processing apparatus 10 according to an exemplary embodiment may not be implemented by a single CPU 21 but may be implemented by a plurality of CPUs 21. Moreover, operation of the information processing apparatus 10 according to an exemplary embodiment may be implemented by CPUs 21 included in a plurality of computers 20 in collaboration which are located physically apart from each other.

In an exemplary embodiment described above, the information processing program is installed in the ROM 22. However, the present disclosure is not limited to this. An information processing program according to an exemplary embodiment may be recorded in a recording medium readable by the computer 20 and provided. For example, the information processing program may be recorded in an optical disk such as a compact disc (CD)-ROM or a digital versatile disc (DVD)-ROM and provided. Furthermore, an information processing program according to an exemplary embodiment may be recorded in a portable semiconductor memory such as a universal serial bus (USB) or a memory card and provided.

Furthermore, the information processing apparatus 10 may acquire the information processing program through the communication unit 27 from an external apparatus connected to a communication line, which is not illustrated in drawings.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
extract a mark specified in advance from an image of a document; and acquire a character string by performing character recognition on a region located in a particular direction with respect to a position of the mark, the direction being associated in advance with the mark, wherein the mark is a character to be used as the mark from among character strings according to a degree of certainty of a character recognition result.

2. The information processing apparatus according to claim 1,
wherein the processor is configured to perform the character recognition on a specified area in the region to acquire the character string.

3. The information processing apparatus according to claim 2,
wherein the processor is configured not to acquire the one or more character strings in a case where the specified area is not present in the direction associated in advance with the mark.

4. The information processing apparatus according to claim 3, wherein the processor is configured to
convert a format of the character string acquired by the character recognition into a data format supported by an application associated in advance with the mark, and
provide the application with the character string in the converted data format.

5. The information processing apparatus according to claim 4, wherein the processor is configured to
provide the application with the character string and an attribute of the character string determined by the mark that has been used to acquire the character string,
control the application to output the character string in a categorized manner based on categorization according to the attribute of the character string.

6. The information processing apparatus according to claim 4, wherein the processor is configured to recommend to a user the character to be used as the mark from among character strings with a degree of certainty of the character recognition result that is higher than a predetermined value.

7. The information processing apparatus according to claim 3, wherein the processor is configured to recommend to a user the character to be used as the mark from among character strings with a degree of certainty of the character recognition result that is higher than a predetermined value.

8. The information processing apparatus according to claim 2, wherein the processor is configured to
convert a format of the character string acquired by the character recognition into a data format supported by an application associated in advance with the mark, and
provide the application with the character string in the converted data format.

9. The information processing apparatus according to claim 8, wherein the processor is configured to
provide the application with the character string and an attribute of the character string determined by the mark that has been used to acquire the character string,
control the application to output the character string in a categorized manner based on categorization according to the attribute of the character string.

10. The information processing apparatus according to claim 9, wherein the processor is configured to recommend to a user the character to be used as the mark from among character strings with a degree of certainty of the character recognition result that is higher than a predetermined value.

11. The information processing apparatus according to claim 2, wherein the processor is configured to recommend to a user the character to be used as the mark from among character strings with a degree of certainty of the character recognition result that is higher than a predetermined value.

12. The information processing apparatus according to claim 8, wherein the processor is configured to recommend to a user the character to be used as the mark from among character strings with a degree of certainty of the character recognition result that is higher than a predetermined value.

13. The information processing apparatus according to claim 1, wherein the processor is configured to
convert a format of the character string acquired by the character recognition into a data format supported by an application associated in advance with the mark, and
provide the application with the character string in the converted data format.

14. The information processing apparatus according to claim 13, wherein the processor is configured to
provide the application with the character string and an attribute of the character string determined by the mark that has been used to acquire the character string,
control the application to output the character string in a categorized manner based on categorization according to the attribute of the character string.

15. The information processing apparatus according to claim 14, wherein the processor is configured to recommend to a user the character to be used as the mark from among character strings with a degree of certainty of the character recognition result that is higher than a predetermined value.

16. The information processing apparatus according to claim 13, wherein the processor is configured to recommend to a user the character to be used as the mark from among character strings with a degree of certainty of the character recognition result that is higher than a predetermined value.

17. The information processing apparatus according to claim 1, wherein the processor is configured to recommend to a user the character to be used as the mark from among character strings with a degree of certainty of the character recognition result that is higher than a predetermined value.

18. The information processing apparatus according to claim 1, wherein the mark is handwritten in the document by a user.

19. A non-transitory computer readable medium storing a program causing a computer to execute a process for information processing, the process comprising:
extracting a mark specified in advance from an image of a document; and
acquiring a character string by performing character recognition on a region located in a particular direction with respect to a position of the mark, the direction being associated in advance with the mark, wherein the mark is a character to be used as the mark from among character strings according to a degree of certainty of a character recognition result.

20. An information processing method, adaptive to perform character recognition on a region of a document specified by a mark, the method comprising:
extracting a mark specified in advance from an image of a document; and
acquiring a character string by performing character recognition on a region located in a particular direction with respect to a position of the mark, the direction being associated in advance with the mark, wherein the mark is a character to be used as the mark from among character strings according to a degree of certainty of a character recognition result.

* * * * *